United States Patent [19]

Fazio

[11] Patent Number: 4,532,304

[45] Date of Patent: Jul. 30, 1985

[54] MODIFICATION OF POLYMERIC AMINE SALTS

[75] Inventor: Michael J. Fazio, Midland, Mich.

[73] Assignee: The Dow Chemical Company, Midland, Mich.

[21] Appl. No.: 579,247

[22] Filed: Feb. 13, 1984

[51] Int. Cl.³ .............................................. C08F 8/08
[52] U.S. Cl. ................................ 525/385; 525/326.8; 525/328.2
[58] Field of Search ........................................ 525/385

[56] References Cited

U.S. PATENT DOCUMENTS 3,640,909 2/1972 Jones et al. ........................... 525/385
4,129,528 12/1978 Petrovich et al. ................... 525/385

Primary Examiner—Bernard Lipman
Attorney, Agent, or Firm—D. L. Corneglio

[57] ABSTRACT

A process for modifying polymeric amine salts containing a halide ion by admixing with an epoxide to form a volatile halo-hydrin. By adjusting the amount of epoxide employed, the polymeric amine salt can be selectively modified by neutralization wherein partial or total conversion of the halide ion to a halo-hydrin is formed and by hydroxylation wherein the free amine sites formed from the conversion of the halide ion to a halo-hydrin are further reacted with excess epoxide to form a hydroxyl containing graft. The halo-hydrin is volatile and, therefore can be removed by distillation from the modified polymeric amine.

15 Claims, No Drawings

MODIFICATION OF POLYMERIC AMINE SALTS

BACKGROUND OF THE INVENTION

The present invention generally relates to a process for modifying polymeric amine salts. Further, the present invention is directed toward a modification process for neutralizing and hydroxylating a polymeric amine salt without generating a residual salt.

Polymeric amine salts containing reactive halide ions can present various problems in their utilization. For example, where a polymeric amine salt is employed in a coating for a metal substrate the halide ion can corrode the metal. This is due to the halide ion forming a hydrogen halide which has deleterious effects on the polymer as well as its environment.

Methods to neutralize polymeric amine salts have been attempted; unfortunately, they produce a by-product of the halide ion which is difficult to remove from the polymeric amine. For example, the neutralization of a polymeric amine salt produced by the acid hydrolysis of an amide containing polymer, is generally accomplished by reacting the hydrolyzed polymer with an inorganic base such as sodium hydroxide. Neutralization with the inorganic bases yields the free amine, but also yields the salt of the inorganic base. This by-product is difficult to remove and can act as a contaminant in the neutralized polymer.

Amide containing polymers can also be hydrolyzed under basic conditions. Unfortunately, this method yields a carboxylic acid salt. This by-product is also difficult to remove and can act as a contaminant in the polymer.

It, therefore, is desirable to neutralize polymeric amine salt without generating the difficult to remove salt contaminants. Additionally, it would be advantageous to be able to hydroxylate the neutralized polymer at the free amine site in a single operation.

SUMMARY OF THE INVENTION

The present invention provides a process for modifying polymeric amine salts containing a halide ion. The process comprises admixing the polymeric amine salt with a sufficient amount of epoxide to convert at least a portion of the halide ions to halo-hydrins whereby a free amine site is formed on the polymeric amine. The amount of epoxide employed can be such that all the halide ions are converted to halo-hydrins. Furthermore, the process can employ sufficient epoxide such that at least a portion of the newly formed free amine sites are hydroxylated. Even further, the process can employ sufficient epoxide such that all of the free amine sites are hydroxylated. The process can also include the additional step of removing the halo-hydrins which is preferably done by distillation. The process can also include the additional step of first dissolving the polymeric amine salt in a solvent prior to admixing it with an epoxide. The process may be carried out at room or elevated temperatures. The epoxides employed are preferably lower alkyl oxides such as ethylene oxide, propylene oxide, butylene oxide or mixtures thereof.

The present invention further provides a process for neutralizing polymeric amine salts containing a halide ion comprising the admixture of the polymeric amine salt with a sufficient amount of epoxide to convert at least a portion of the halide ions to halo-hydrins whereby a free amine site is formed on the polymeric amine. The process may also be performed where the epoxide is sufficient to convert all the halide ions to halo-hydrins. The process further comprises removing the halo-hydrins, preferably, by distillation. The process may also include the step of dissolving the polymeric amine salt in a solvent prior to admixing it with the epoxide. The process may be carried out at room or elevated temperatures. The epoxides employed are preferably lower alkyl oxides such as ethylene oxide, propylene oxide, butylene oxide or mixtures thereof.

Even further, the present invention provides for a process for hydroxylating polymeric amine salts containing a halide ion, comprising the admixture of said polymeric amine salt with an amount of epoxide sufficient to convert said halide ions to halo-hydrins whereby free amine sites are formed such that additional epoxide can form hydroxyl groups on at least a portion of the free amine sites. The amount of epoxide employed can also be such that all the free amine sites are hydroxylated. The amount of epoxide being a stoichiometric excess based upon the amount of available halogen ions on the polymeric amine salt. The process can further comprise the step of removing the halo-hydrin. This step can be accomplished by distillation. The process may further comprise the step of dissolving the polymeric amine salt in a solvent prior to admixing it with the epoxide. The process may be carried out at room or elevated temperatures. The epoxides employed are preferably lower alkyl oxides such as ethylene oxide, propylene oxide, butylene oxide or mixtures thereof.

DETAILED DESCRIPTION OF THE INVENTION

The invention as described provides a process for modifying polymeric amine salts containing a halogen ion. Modification of a polymeric amine salt includes both neutralization and hydroxylation. Neutralization is the process whereby the polymeric amine salt is reacted with an epoxide to remove the halide ion and, thus, form a free amine site on the polymer. Hydroxylation is the process whereby the free amine site formed by the neutralization of the polymer is acted upon by excess epoxide to form a hydroxyl containing group at the free amine site.

The process generally comprises contacting a polymeric amine salt with an epoxide such that the epoxide can react with the halide ion to form the corresponding volatile halo-hydrin. The polymeric amine salt is thus neutralized and the halo-hydrin may be removed from the polymer by distillation such that a pure form of the modified polymer is obtained. Further, by adjusting the amount of epoxide reacted with the polymeric amine salt one can adjust the amount of neutralization, i.e., the amount of halogen ions that are converted to the halo-hydrin.

Furthermore, by using a stoichiometric excess of epoxide based on the amount of available halogen ions contained by the polymeric amine salt all of the halogen ions can be converted to halo-hydrins to form free amine sites. The excess epoxide can then be allowed to further react with the neutralized polymer at the free amine sites such that hydroxylation of the polymeric amine will occur. The hydroxylation reaction would typically involve the epoxide reacting at the free amine site to form a hydroxyl group. For example, if the epoxide employed was ethyl oxide an excess amount would react to form a hydroxyl ethyl group at the free amine site of the neutralized polymer.

The modification process of the polymeric amine salts can be monitored using techniques generally known in the art. With respect to the neutralization reaction, the halogen ion concentration can be monitored by titration techniques. With respect to the hydroxylation reation, the amount of hydroxyl containing groups grafted onto the polymeric amine can be monitored by proton NMR.

The process conditions are generally those sufficient to react the epoxides with polymeric amine salts, in particular the halide ion. The rection can be carried out at room temperature or at an elevated temperature by contacting the reactants in a reaction vessel. Preferably, the reaction is carried out at an elevated temperature in order to reduce the reaction time. The temperature range is limited by the maximum temperature that the particular polymeric amine salt can withstand without degrading or crosslinking.

The polymeric amine salt can be mixed with the epoxide in a reaction vessel. Alternatively, the polymeric amine salt can be dissolved in a solvent prior to admixing it with the epoxide. Preferably, the polymeric amine salt is dissolved in an organic solvent and the epoxide is added. Further, excess epoxide can be employed as the solvent. Other exemplary solvents are acetonitrile, dioxane, tetrahydrofuran, glycol ethers or alcohols.

Generally, the polymeric amine salt and the epoxide are added to a reaction vessel with stirring and heat. Alternatively, the reaction mixture can be left to react at room temperature. After the desired amount of halide ion has been converted to a volatile halo-hydrin, the mixture can be distilled to remove the halo-hydrin as a distillate and, thus, leave the neutralized polymeric amine behind as a product. To facilitate the removal of the halo-hydrin, the reaction mixture can be diluted. A typical diluent is water, however, other known diluents which are inert in the instant mixture can be employed. The diluted mixture is distilled to remove the halo-hydrin, whereafter the polymeric product can be collected.

Polymeric amine salts that can be treated by the subject process comprise those polymeric amines which contain a halogen ion. The polymeric amine salts generally comprise hydrolyzed homopolymers and copolymers of 2-oxazoline monomers such as N-acylated polyethyleneimines or polytrimethyleneimines. As used herein, "2-oxazoline" includes both 2-oxazoline and 2-oxazine monomers and "hydrolyzed" is used to indicate hydrolysis with a strong acid such as HCl, HBr or HI. Hydrolysis can be either partial or complete. Other polymeric amine salts utilizable in the subject process comprise polymers or copolymers of aminoethyl acrylate and aminoethyl methacrylate.

The epoxide employed in the subject process are generally those selected from the lower alkyl oxides. The preferred epoxides are ethylene oxide, propylene oxide or butylene oxide. The amount of epoxide employed is in relation to the amount of halide ions to be neutralized and the amount of free amine sites to be hydroxylated. To insure that a sufficient quantity of epoxide is present, a stoichiometric calculation can be performed on the basis of the amount of available halogen ions. Therefore, a sufficient amount of epoxide can be added to the polymeric amine salt such that (1) at least a portion of the halide ions are converted to halohydrins to form free amine sites on the polymeric amines, (2) all of the halide ions are converted to halohydrins to form free amine sites on the polymeric amine, (3) at least a portion of the free amine sites formed by the neutralization of a polymeric amine salt are hydroxylated, and (4) where all of said free amine sites formed by the neutralization of the polymeric amine salts are hydroxylated. The latter two cases would be where a stoichiometric excess of the epoxide is added based upon the total amount of halogen ions available on the polymeric amine salt.

By means of illustration the following examples of the subject process for modifying polymeric amine salts are provided.

EXAMPLE 1

(A) Hydrolysis

A polymer of polyethyloxazoline (PEOX) was hydrolyzed under acidic conditions by adding 258 g of PEOX to 650 ml of water and 11 ml of concentrated hydrochloric acid to a resin pot and heated to reflux. After refluxing for 5 hours, the mixture was homogeneous and the condensor was exchanged for a distillation head. Propionic acid, water and unreacted HCl were distilled out; 275 ml of overhead was collected. The concentrated polymer solution was then cooled to room temperature and analyzed. The solution was 59 percent water and contained 0.147 meq amine/g and 0.15 meq $Cl^\ominus/g$. The polymer was then dried in a vacuum oven at 180° C. for 4 hours.

(B) Neutralization

The dry polymer (175.7 g) was dissolved in 273 g of acetonitrile. The acetonitrile solution was charged into a 1-liter stainless steel Parr reactor with 30 g of propylene oxide and heated 18 hours at 100° C. The cooled reaction mixture was diluted with water and stripped on a Rotovap at reduced pressure. The polymer solution recovered was 60 percent water, 0.135 meq amine/g with no detectable $Cl^\ominus$. Analysis by H-NMR showed 3.8 percent hydroxypropyl groups incorporated on the polymer.

EXAMPLE 2

A 40 percent aqueous solution of partially hydrolyzed PEOX (6.4 g) and 7.8 g of acetonitrile were mixed at room temperature. The PEOX had molecular weight of 500,000 and was hydrolyzed to approximately 5 percent. A 2.0 g aliquot was mixed with 0.15 g of butylene oxide and a second 2.0 g aliquot was mixed with 0.1 g of propylene oxide. The samples were left to stand in sealed vials at room temperature along with an untreated comparative sample. At various time intervals the samples were tested for the presence of $Cl^\ominus$. The results were as follows:

| | $Cl^\ominus$ Analysis (meq $Cl^\ominus$/l) | | |
|---|---|---|---|
| Time | Untreated Sample | Propylene Oxide Treated | Butylene Oxide Treated |
| Initial | 67 | 67 | 67 |
| 17 hours | 67 | 57 | 67 |
| 11 days | 78 | 24 | 26 |

As is shown by the data, both the propylene oxide and butylene oxide effectively formed the volatile chlorohydrin compound at room temperature which could then be removed from the modified PEOX by distillation.

EXAMPLE 3

A partially hydrolyzed sample of PEOX, as employed in Example 2, was treated with propylene oxide using the same procedure as in Example 2. This sample along with an untreated sample of hydrolyzed PEOX were then heated on a steam bath and aliquots were taken to measure chlorine ion content of each sample at various time intervals. The results obtained were as follows:

| | $Cl^\ominus$ Analysis (meq $Cl^\ominus$/l) | |
|---|---|---|
| Time | Untreated Hydrolyzed PEOX | Propylene Oxide Treated Hydrolyzed PEOX |
| Initial | 70 | 70 |
| 2 hours | 71 | 19 |
| 3 hours | 79 | 12 |

The data shows a significant reduction in chlorine ion for the propylene oxide treated hydrolyzed PEOX after only three hours time. This reduction in chlorine ion indicates the formation of chlorohydrin which can be distilled off thereby leaving no halide ion contaminate in the modified PEOX.

EXAMPLE 4

A copolymer of aminoethylmethacrylate hydrochloride having an amine equivalent weight of 443 was prepared by copolymerization with methylmethacrylate, butylacrylate and styrene. The copolymer was prepared in a glycol ether (1-methoxy-2-propanol hereinafter DOWANOL ® PM) to form solution containing 38 percent polymer solids. The copolymer was then mixed with various amounts of propylene oxide at room temperature and heated on a steam bath for two hours. The samples were cooled and aliquots taken to determine chlorine ion content. The results were as follows:

| | $Cl^\ominus$ Analysis After Two Hour Steam Bath | | |
|---|---|---|---|
| Sample | Grams of Polymer Solution | Grams of Propylene Oxide | $Cl^\ominus$ (meq/l) |
| 1* | 10.0 | 0.0 | 866 |
| 2 | 10.0 | 0.5 | 714 |
| 3 | 10.0 | 1.0 | 228 |
| 4 | 10.0 | 2.0 | 88 |

*Untreated Sample.

The cooled Samples 2-4 were diluted with additional glycol ether, DOWANOL ® PM, and water and distilled to remove the propylenechlorohydrin formed during modification.

What is claimed is:

1. A process for modifying polymeric amine salts containing a halide ion comprising:
   admixing said polymeric amine salt with a sufficient amount of lower alkyl oxide to convert at least a portion of said halide ions to halo-hydrins whereby a free amine site is formed on said polymeric amine.

2. The process of claim 1 wherein the amount of said lower alkyl oxide is such that all of said halide ions are converted to halo-hydrins.

3. The process of claim 1 wherein the amount of said lower alkyl oxide is such that at least a portion of said free amine sites are hydroxylated.

4. A process for neutralizing polymeric amine salts containing a halide ion comprising:
   admixing said polymeric amine salt with a sufficient amount of lower alkyl oxide to convert at least a portion of said halide ions to halo-hydrins whereby a free amine site is formed on said polymeric amine.

5. The process of claim 4 wherein the amount of said lower alkyl oxide is such that all said halide ions are converted to halo-hydrins.

6. A process for hydroxylating polymeric amine salts containing a halide ion comprising:
   admixing said polymeric amine salt with a sufficient amount of lower alkyl oxide to convert said halide ions to halo-hydrins whereby free amine sites are formed such that additional epoxide can form hydroxyl groups on at least a portion of said free amine sites.

7. The process of claim 6 wherein the amount of lower alkyl oxide is such that all of said free amine sites are hydroxylated.

8. The process of claims 5 or 6 wherein the amount of said lower alkyl oxide is a stoichiometric excess based on the amount of available halogen ions.

9. The process of claims 1, 4 or 6 wherein said halo-hydrins are removed.

10. The process of claim 9 wherein said halo-hydrin is removed by distillation.

11. The process of claims 1, 4 or 6 wherein said polymeric amine salt has been dissolved in a solvent prior to admixing with said epoxide.

12. The process of claims 1, 4 or 6 wherein said admixture is reacted at an elevated temperature.

13. The process of claims 1, 4 or 6 wherein said polymeric amine salt is an acid hydrolyzed polyoxazoline.

14. The process of claim 13 wherein said polyoxazoline is polyethyloxazoline.

15. The process of claims 1, 4 or 6 wherein said lower alkyl oxide is ethylene oxide, propylene oxide, butylene oxide or mixtures thereof.

* * * * *